(12) United States Patent
Momona (10) Patent No.: US 6,738,816 B1
(45) Date of Patent: May 18, 2004

(54) SYSTEM AND METHOD FOR RELIABLE REAL-TIME COMMUNICATIONS AMONG A PLURALITY OF NODES HAVING FUNCTIONS CONFORMING TO IEEE-1394 SERIAL BUS AND PARTICIPATING IN A SESSION OF SHARING THE MAXIMUM BANDWIDTH

(75) Inventor: Morihisa Momona, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/522,777

(22) Filed: Mar. 8, 2000

(30) Foreign Application Priority Data

Mar. 9, 1999 (JP) ............................. 11-061767

(51) Int. Cl.⁷ .......................................... G06F 15/173
(52) U.S. Cl. ........................................ 709/226; 709/223
(58) Field of Search .................. 709/223–224, 709/226, 238; 370/443, 438, 236, 260

(56) References Cited

U.S. PATENT DOCUMENTS

| | | | | |
|---|---|---|---|---|
| 5,825,752 A | * | 10/1998 | Fujimori et al. | 370/260 |
| 6,160,796 A | * | 12/2000 | Zou | 370/257 |
| 6,212,633 B1 | * | 4/2001 | Levy et al. | 713/153 |
| 6,252,886 B1 | * | 6/2001 | Schwager et al. | 370/443 |
| 6,311,243 B1 | * | 10/2001 | Hamamoti et al. | 710/107 |
| 6,389,496 B1 | * | 5/2002 | Matsuda | 710/131 |
| 6,434,117 B1 | * | 8/2002 | Momona | 370/236 |

FOREIGN PATENT DOCUMENTS

| | | |
|---|---|---|
| JP | 8-8913 | 1/1996 |
| JP | 8-340338 | 12/1996 |
| JP | 10-308756 | 11/1998 |
| JP | 10-308759 | 11/1998 |
| JP | 11-261606 | 9/1999 |

OTHER PUBLICATIONS

Copy of Japanese Office Action dated Feb. 12, 2003 (with English translation of relevant portion).
Information re The Proceedings of the 1998 IEICE General Conference, The Institute of Electronics, Information and Communication Engineers, Tokai University, Hiratsuka (Mar. 27–30, 1998).

* cited by examiner

Primary Examiner—Hosain Alam
Assistant Examiner—Philip B. Tran
(74) Attorney, Agent, or Firm—Dickstein, Shapiro, Morin & Oshinsky, LLP.

(57) ABSTRACT

A data communication method allowing reliable real-time communications among a plurality of nodes participating in a session is disclosed. In the case where a plurality of nodes participate in a session such that two or more nodes do not concurrently send data, a session management node reserves a necessary bandwidth needed by all the nodes participating in the session by accessing the Isochronous Resource Manager.

17 Claims, 9 Drawing Sheets

SYSTEM AND METHOD FOR RELIABLE REAL-TIME COMMUNICATIONS AMONG A PLURALITY OF NODES HAVING FUNCTIONS CONFORMING TO IEEE-1394 SERIAL BUS AND PARTICIPATING IN A SESSION OF SHARING THE MAXIMUM BANDWIDTH

BACKGROUND OF THE INVENTION

1. Field of the Invention

The present invention relates to a communication network composed of a plurality of nodes, each of which is provided with data transmission and reception functions conforming to IEEE 1394-1995 Serial Bus Standard (hereafter, referred to as IEEE1394) and, in particular, to a data communication method allowing data communication among these nodes according to communication protocols such as TCP/IP (Transmission Control Protocol/Internet Protocol).

2. Description of the Related Art

The IEEE 1394 standard defined in 1995 is an international standard for implementing a cost-effective and high-speed digital interface. The IEEE 1394 serial bus provides high-speed data transport of several hundreds of megabits per second and therefore enables real-time transport required for digital video data transmission. Therefore, the IEEE 1394 digital interface is caused to provoke widespread attention as a digital interconnect for both computer peripherals and consumer electronics including digital video cameras and digital television sets.

There has been known so-called "IP over 1394" defined by IETF (Internet Engineering Task Force), which can support the transport of Internet Protocol (TP) data over a communication network conforming to the IEEE1394 standard. The IP-over-1394 system provides necessary methods for transmitting and receiving IP unicast data, IP multicast data, and IP broadcast data. More specifically, in the case of IP unicast, Asynchronous packets of IEEE1394 are used for communication. In the cases of IP multicast and IP broadcast, an Asynchronous-Stream channel is used for communication.

Further, the IP-over-1394 system provides MCAP (Multicast Channel Allocation Protocol) which defines an allocation method of an Asynchronous Stream channel for multicast. More specifically, in the case of multicast channel allocation, a first node which intends sending data sends a message for querying whether the Asynchronous-Stream channel for multicast has been allocated in the network. When receiving no reply to the query message, the first node requests a new channel from IRM (Isochronous Resource Manager) defined in the IEEE 1394. After the channel has been allocated to the first node, the first node uses the allocated channel to send multicast data.

Thereafter, in the case where a second node starts sending or receiving multicast data, the second node sends a query message for querying whether the Asynchronous-Stream channel for multicast has been allocated in the network. When receiving the query message from the second node, the first node sends a message indicating correspondence information between multicast addresses and the allocated channel to the second node. When receiving the correspondence information message, the second node uses the designated channel for communication.

In the case where the first node completes the data sending, the first node sends a channel control transfer message including the correspondence information between the multicast addresses and the allocated channel. If a third node other than the first and second nodes which is sending data to nodes of the same multicast addresses is received the channel control transfer message, then the third node sends a message indicating the correspondence information between the multicast addresses and the allocated channel and inherits the channel control from the first node. In this case, the first node terminates the communication with doing nothing. If there is a no node inheriting the channel control like the third node, then the channel allocated to the first node is deallocated by the IRM before the first node terminates the communication.

As described above, the node that sends multicast packets has a channel allocated thereto by the IRM. However, a sufficient bandwidth for data communication is not always reserved. In the case of data communication requiring real-time processing such as voice and moving-picture transmission of a television conference system, it is difficult to transmit voice and moving-picture data in real time when the network falls into congestion.

In the system composed of a plurality of nodes such as a television conference system, there are possibly two cases: one case where only one of the nodes sends data at all times; and the other case where all the nodes can concurrently send data. In the former case, it is necessary to reserve the widest one of the bandwidths required for the nodes. In the latter case, it is necessary to reserve a total of bandwidths required for all the nodes.

In the television conference system, voice communication is an example of the former case because only one node talks when N nodes are in conversation. Therefore, the bandwidth required for voice communication of only one node may be reserved. In the case where the nodes have different voice qualities, it is necessary to reserve the widest one of the bandwidths required for the nodes. Moving-picture communication is an example of the latter case because video data is always transmitted from each of the nodes. Therefore, it is necessary to reserve a total of bandwidths required for video communications of all the nodes.

It is possible to provide a node with a means for reserving a bandwidth required for the node itself. However, such a means cannot cope with a case where two or more nodes send data with different required bandwidths and different uses of reserved bandwidths.

SUMMARY OF THE INVENTION

An object of the present invention is to provide a data communication method allowing real-time communications among a plurality of nodes participating in a session even in the event of network congestion.

Another object of the present invention is to provide a data communication method allowing real-time communications among a plurality of nodes requiring different bandwidths and different uses of reserved bandwidths.

According to the present invention, in the case where a plurality of nodes participate in a session such that two or more nodes do not concurrently send data, a session management node which manages a channel and a bandwidth thereof for the session is determined and reserves a maximum bandwidth among bandwidths requested by the nodes participating in the session by accessing the Isochronous Resource Manager, to allow communications by sharing the maximum bandwidth among nodes which participate in the session and send data.

A first node which intends sending data in the session broadcasts a first query message for querying whether a channel and a bandwidth for the session have been reserved. When the first node is an initial node to send data, the first node receives no response to the first query message. In this case, the first node reserves a channel and a first bandwidth needed by the first node for the session. Thereafter, the first node becomes the session management node and sends data using an isochronous stream through the reserved channel.

When receiving a second query message for querying whether a channel and a bandwidth for the session have been reserved, from a second node other than the session management node, wherein the second query message includes a second bandwidth needed by the second node, the session management node compares the second bandwidth requested by the second node with a reserved bandwidth which has been reserved for the session in the network.

When the second bandwidth is broader than the reserved bandwidth, the session management node reserves a differential bandwidth between the second bandwidth and the reserved bandwidth accessing the Isochronous Resource Manger to reserve the maximum bandwidth among bandwidths requested by the nodes participating in the session. Then, the session management node broadcasts a report message including session identifying information and the maximum bandwidth which is sharable. In this manner, the maximum bandwidth which has been reserved is used as a shared bandwidth by all the nodes participating in the session.

As an example, in the case of a third node participating in the session only to receive data, a third query message is broadcast for querying whether a channel and a bandwidth for the session have been reserved. When receiving the third query message, the session management node broadcasts a second report message indicating the channel and the maximum bandwidth for the session. When receiving the second report message, the third node starts receiving data through the channel designated by the second report message received from the session management node.

Further, when the fourth node withdraws from the session, the fourth node other than the session management node terminates communication. However, when the session management node withdraws from the session, the session management node broadcasts a control transfer message for transferring control of the channel and the bandwidth for the session the control transfer message including information of the channel and the maximum bandwidth. When receiving no response to the control transfer message, the session management node returns the maximum bandwidth which has been reserved to the Isochronous Resource Manager to terminate communication. When receiving a response to the control transfer message from a fifth node continuing to send data in the session, the session management node terminating the communication. Therefore, in the case where a node terminates communication, the reserved bandwidth can be deallocated, resulting in improved efficient use of bandwidth of the network.

The fifth node broadcasts a control inheritance message for inheriting the control of the channel and the bandwidth for the session in response to the control transfer message received from the session management node. When receiving the control inheritance message from a sixth node, the fifth node determines whether the fifth node inherits the control of the channel and the bandwidth for the session depending on a comparison between node identification numbers of the fifth node and the sixth node. More specifically, only one node having a maximum node identification number among nodes each broadcasting the control inheritance message inherits the control of the channel and the bandwidth for the session so that the only one node becomes the session management node. Therefore, a control inheritance conflict can be avoided in the case where a plurality of nodes intend inheriting the control of the channel and the bandwidth for the session.

As another example, the session management node periodically broadcasts a third report message indicating the channel and a first bandwidth needed by the session management node. When there is a seventh node receiving the third report message, the seventh node compares a seventh bandwidth for the session needed by the seventh node with the first bandwidth needed by the session management node. When the seventh bandwidth is broader than the first bandwidth, the seventh node broadcasts a fourth query message including information of the seventh bandwidth, when the session management node receives at least one fourth query message, the session management node compares the reserved bandwidth which has been reserved with a maximum received bandwidth selected from at least one fourth query message received. When the maximum received bandwidth is narrower than the reserved bandwidth, the session management node returns a differential bandwidth between the maximum received bandwidth and the reserved bandwidth to the Isochronous Resource Manager. When a node needing the maximum received bandwidth withdraws from the session, the session management node deallocates the differential bandwidth by accessing the Isochronous Resource Manager.

Assuming that a size of Subaction Gap defined in IEEE1394 is SG, a size of Arbitration Reset Gap defined in IEEE1394 is ARG, a maximum size of a frame allowed to be sent in Asynchronous Stream defined in IEEE1394 is M, and a number of nodes connected to the network is N, a remaining amount of bandwidth in the Isochronous Resource Manager is B, when the remaining bandwidth B is equal to or smaller than $(SG+M) \times N+ARG$, each node performs data transmission using an asynchronous stream instead of an isochronous stream, allowing data to be sent a plurality of times in one cycle time defined in IEEE1394.

According to another aspect of the present invention, in a network where a plurality of nodes participate in a session such that two or more nodes can send data concurrently, a session management node reserves a first bandwidth needed by the session management node by accessing the Isochronous Resource Manager. Each of the nodes other than the session management node reserves a bandwidth needed by the node by accessing the Isochronous Resource Manager, to allow communications such that a dedicated bandwidth is allocated to the node.

In the case of a first node which intends sending data in the session, the first node broadcasts a first query message for querying whether a channel for the session have been reserved. When the channel for the session have not been reserved in the network, the first node reserves a channel by accessing the Isochronous Resource Manager, so that the first node becomes the session management node.

In the case of a second node participating in the session other than the session management node, the second node broadcasts a query message for querying whether a channel for the session have been reserved. The session management node broadcasts a report message indicating the channel for the session and the reserved bandwidth starts of "occupied" in response to the query message received from the node. The second node reserves the bandwidth needed by the second node by accessing the Isochronous Resource Manager, to send data through the channel designated by the report message received from the session management node. In this manner, the session management node reserves only the channel and the bandwidth is reserved by each node sending data. Therefore, the respective bandwidths needed by all the nodes are reserved.

A third node participating in the session only to receive data broadcasts a third query message for querying whether a channel for the session have been reserved. The session management node broadcasts a second report message indicating the channel for the session in response to the third query message. The third node starts receiving data through the channel designated by the second report message received from the session management node.

When the third node withdraws from the session, the third node terminates communication. When a fourth node participating in the session to send data withdraws from the session, the fourth node returns a bandwidth reserved for the fourth node to the Isochronous Resource Manager to terminate communication. The session management node broadcasts a control transfer message for transferring control of the channel for the session when the session management node withdraws from the session. When receiving no response to the control transfer message, the session management node returns the channel and the bandwidth which has been reserved to the Isochronous Resource Manager to terminate communication. When receiving a response to the control transfer message from a fifth node continuing to send data in the session, the session management node returns the bandwidth which has been reserved to the Isochronous Resource Manager to terminate communication.

The fifth node broadcasts a control inheritance message for inheriting the control of the channel for the session in response to the control transfer message received from the session management node. When receiving the control inheritance message from a sixth node, the fifthe node determines whether the fifth node inherits the control of the channel for the session depending on a comparison between node identification numbers of the fifth node and the sixth node. More specifically, only one node having a maximum node identification number amount nodes each broadcasting the control inheritance message inherits the control of the channel for the session so that the only one node becomes the session management node. Therefore, a control inheritance conflict can be avoided in the case where a plurality of nodes intend inheriting the control of the channel for the session.

As described above, a data communication method according to the present invention ensures a necessary bandwidth, allowing real-time communications among a plurality of nodes participating in a session even in the event of network congestion. Further, real-time communications can be achieved among a plurality of nodes requiring different bandwidths and different uses of reserved bandwidths.

DETAILED DESCRIPTION OF THE PREFERRED EMBODIMENTS

Figure 1:
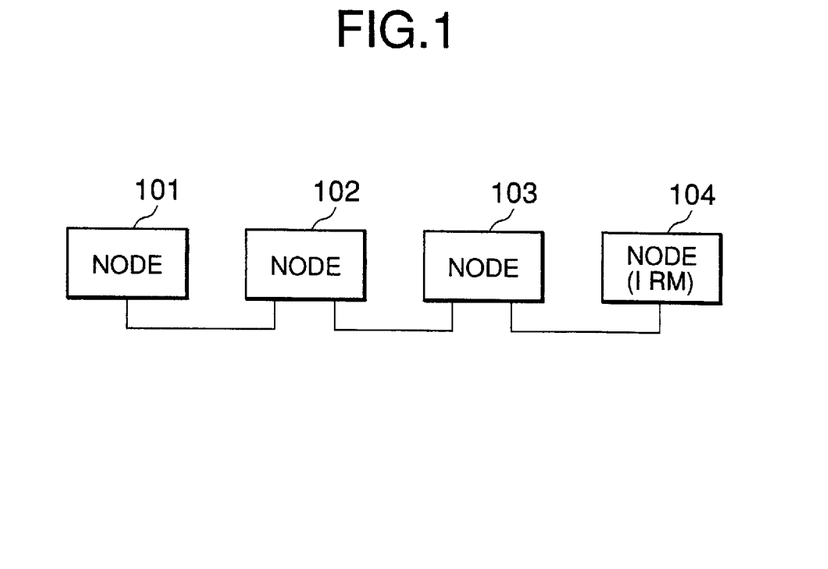
FIG. 1 is a block diagram showing an example of an IEEE 1394-1995 network implementing a data communication method according to the present invention.

Referring to FIG. 1, it is assumed for a simplicity that a network is composed of a plurality of nodes 101 104 each having a data link function conforming to IEEE1394. At least one of the nodes 101–104 has an IRM (Isochronous Resource Manager) function. In this example, the node 104 has the IRM function. Further, each of the nodes 101–104 has a communication function conforming to a predetermined communication protocol suite such as TCP/IP defined by IETF and a function conforming to IP-over-1394 defined by IETF, which allows IP packet transfer among the nodes using the IEEE1394 function. It should be noted that the present invention is not limited to TCP/IP and IP-over-1394 but to any other communication protocol.

It is assumed that a session is composed of two or more nodes which are allowed to communicate with each other. A node participating in the session uses a predetermined multicast IP address a predetermined protocol. Here, the communication can be performed using A1 as the predetermined multicast IP address, UDP (User Datagram Protocol) as the predetermined protocol, and P1 as the destination port number which is arbitrarily selected by UDP. These parameters specifying the session are not limited to the above destination address, protocol type and destination port number. Other combination is possible depending on employed protocol.

It is further assumed for simplicity that the nodes 101 and 102 perform both sending and receiving operations and the node 103 performs only receiving operation.

Figure 2:
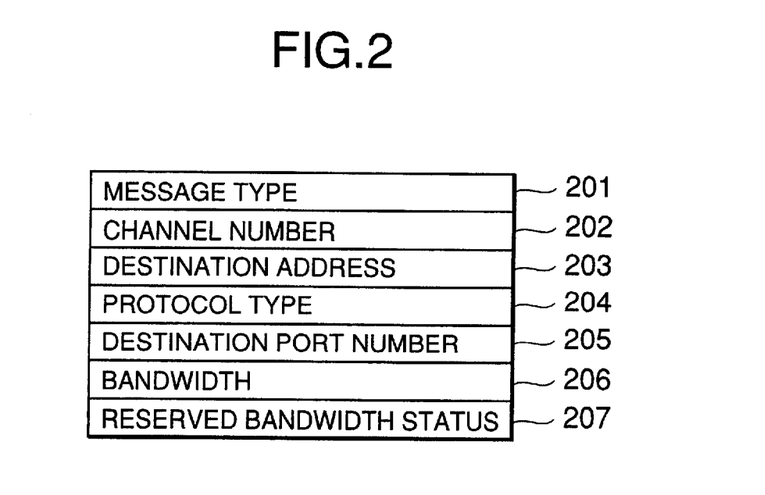
FIG. 2 is a diagram showing a format of a message used in the network.

Referring to FIG. 2, a message is composed of message type 201, channel number 202, destination address 203, protocol type 204, destination port number 205, bandwidth 206, and reserved bandwidth status 207. In this embodiment, the message type 201 is one of "query", "report", and "control transfer". The reserved bandwidth status 207 is one of "shared" and "occupied".

The message format is not limited to as shown in FIG. 2. A message format including session identifying information, channel number 202, bandwidth 206, and reserved bandwidth status 207 is acceptable.

FIRST EMBODIMENT

Hereafter, it is assumed that the node 101 uses a bandwidth of B1 to send data in the session, the node 102 uses a bandwidth of B2 to send data in the session, and the nodes 101 and 102 do not send data concurrently.

Initial channel and bandwidth reservation

Figure 3:
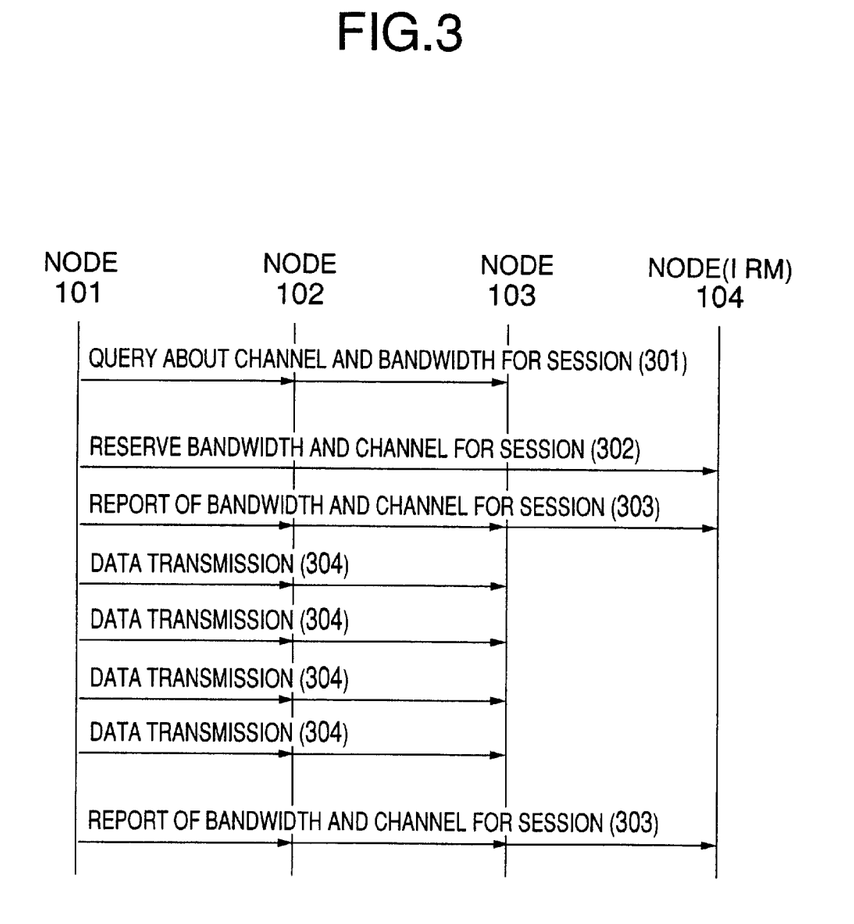
FIG. 3 is a sequence diagram showing a channel and bandwidth reserving procedure performed by a node which initially starts sending data according to a first embodiment of the present invention.

Referring to FIG. 3, the node 101 which intends sending data initially broadcasts a query message 301 for querying whether a channel and bandwidth for this session have been reserved, the query message 301 including information of a bandwidth required by the node 101 itself. The query message 301 includes: message type 201="query", destination address 203-A1, protocol type 204=UDP, destination port number 205=P1, bandwidth 206=B1, and reserved bandwidth status 207="shared".

When the node 101 receives no reply to the query message 301, the node 101 performs processing 302 to reserve the channel=C1 and the bandwidth=B1 by accessing the node 104 which is the IRM. Thereafter, the node 101 periodically broadcasts a report message 303 indicating session information about session channel and bandwidth. The message 303 has message type 201 set to "report", channel number 202 set to C1, destination address 203 set to A1, protocol type 204 set to "UDP", destination port number 205 set to P1, bandwidth 206 set to a total of bandwidths which have been reserved by the node 101 (at this time, B1), and reserved bandwidth status 207 set to "shared".

Then, the node 101 starts sending data 304 (talking) using Isochronous Stream through the reserved channel #C1 and at the same time starting receiving (listening) data using the same channel #C1. In this manner, the node 101 is allowed to send data using the channel #C1 and the requested bandwidth of B1.

Second of later channel and bandwidth reservation

Figure 4:
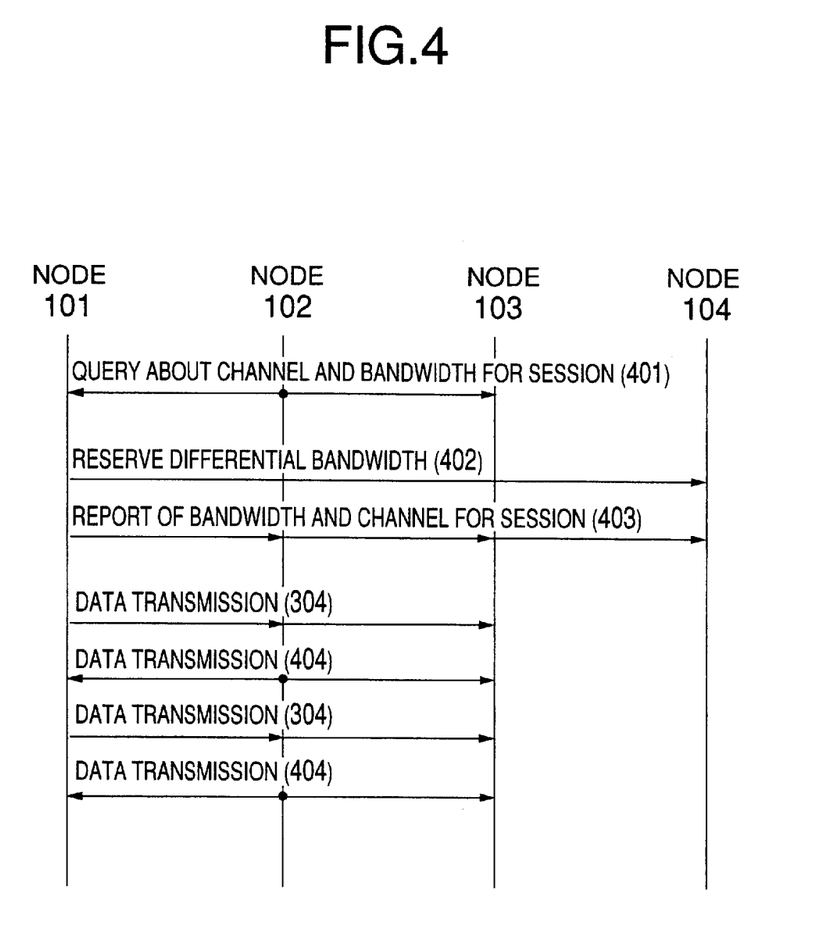
FIG. 4 is a sequence diagram showing a differential bandwidth reserving procedure performed by a node which starts sending data second or thereafter according to the first embodiment.

Referring to FIG. 4, it is assumed that the node 102 intends sending data. First, the node 102 broadcasts a query message 401 for querying whether a channel and bandwidth for this session have been reserved, the query message 401 including: message type 201="query", destination address 203=A1, protocol type 204=UDP, destination port number 205=P1, bandwidth 206=B2, and reserved bandwidth status 207="shared".

When the node 101 receives the query message 401 from the node 102, the node 101 reads the session information included in the query message 401, that is, the destination address 203, the protocol type 204, and the destination port number 205. The node 101 determines from the received session information whether the query message 401 is directed to the session managed by the node 101 itself. Since the destination address 203 is A1, the protocol type 204 is UDP, and the destination port number 203 is P1, the node 101 determines that the query message 401 is directed to the session managed by the node 101.

When it is determined that the query message 401 is directed to the session managed by the node 101, the node 101 reads the requested bandwidth of B2 from the received query message 401 and determines whether the requested bandwidth of B2 is broader than the currently reserved bandwidth (at this time, B1). If the requested bandwidth of B2 is broader than the currently reserved bandwidth of B1, then the node 101 performs bandwidth reservation processing 402 to reserve the differential bandwidth=B2−B1 by accessing the node 104 which is the IRM. If the requested bandwidth of B2 is not broader than the currently reserved bandwidth of B1, then the node 101 does not perform the bandwidth reservation processing 402.

Thereafter, the node 101 broadcasts a report message 403 indicating session information about session channel and bandwidth. The message 403 has message type 201 set to "report", channel number 202 set to C1, destination address 203 set to A1, protocol type 204 set to "UDP", destination port number 205 set to P1, bandwidth 206 set to a total of bandwidth which have been reserved by the node 101 (at this time, a broader one of B1 and B2), and reserved bandwidth status 207 set to "shared".

When receiving the report message 403, the node 102 starts sending data 404 (talking) using Isochronous Stream through the channel #C1 and at the same time starting receiving (listening) data using the same channel #C1. In this manner, the node 102 is allowed to send data using the channel #C1 and the requested bandwidth of B2.

As described before, there is no case where the nodes 101 and 102 concurrently send data. Therefore, neither the node 101 nor the node 102 sends data requiring a bandwidth greater than the bandwidth assigned to the channel #C1.

Here, assuming that the size of Subaction Gap defined in IEEE1394 is SG, the size of Arbitration Reset Gap defined in IEEE1394 is ARG, the maximum size of a frame allowed to be sent in Asynchronous Stream defined in IEEE1394 is M, and the number of nodes connected to the bus is N, the maximum value of Fairness Interval defined in IEEE1394 is represented by (SC+M)×N+ARG.

Each of the nodes 101 and 102 is provided with means for reading the remaining amount of bandwidth B in the IRM (here, the node 104). When the remaining bandwidth B is equal to or smaller than the maximum value of Fairness Interval, (SG+M)×N+ARG, each node performs data transmission using Asynchronous Stream instead of Isochronous Stream. According to IEEE1394, each node is permitted to send only data of a single isochronous stream is Cycle Time. On the other hand, each node is permitted to send only data or a single asynchronous stream in Fairness Interval. Therefore, if the maximum value of Fairness Interval, (SG+M)×N+ARG, is greater than the bandwidth B remaining in a cycle time, then the asynchronous stream allows data to be sent a plurality of times in one cycle time, resulting in more efficient data transmission.

Second or later receiving procedure

Figure 5:
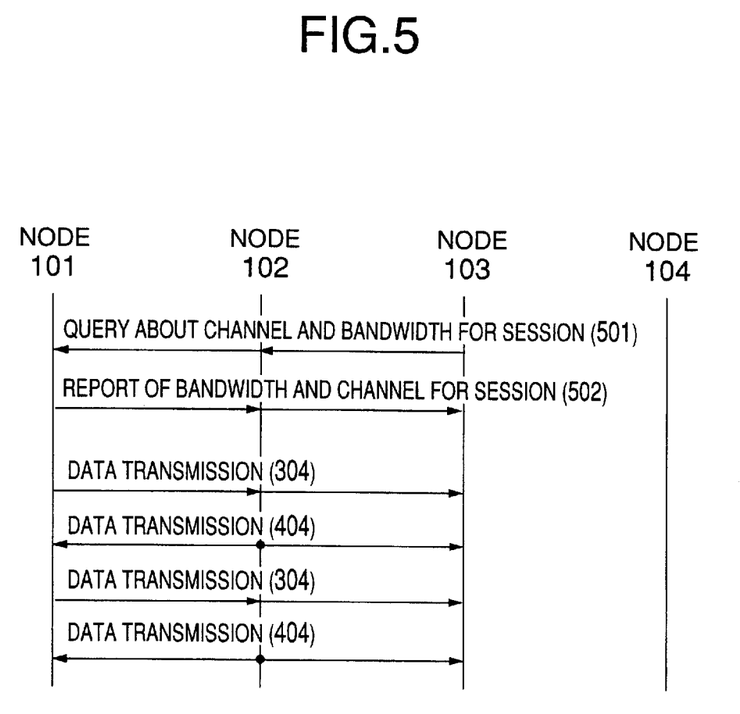
FIG. 5 is a sequence diagram showing a channel notifying procedure for notifying a node which starts receiving data about a channel to be used according to the first embodiment.

Referring to FIG. 5, it is assumed that the node 103 intends receiving data. First, the node 103 broadcasts a query message 501 for querying whether a channel and bandwidth for this session have been reserved, the query message 501 including: message type 201="query", destination address 203=A1, protocol type 204=UDP, destination port number 205=P1, and bandwidth 206−0.

When the node 101 receives the query message 501 from the node 103, the node 101 reads the session information included in the query message 501, that is, the destination address 203, the protocol type 204, and the destination port number 205. The node 101 determines from the received session information whether the query message 501 is directed to the session managed by the node 101 itself. Since the destination address 203 is A1, the protocol type 204 is UDP, and the destination port number 205 is P1, the node 101 determines that the query message 501 is directed to the session administrated by the node 101.

When it is determined that the query message 501 is directed to the session managed by the node 101, the node 101 reads the requested bandwidth from the received query message 501. Here, since no bandwidth is requested (bandwidth 206=0). The node 101 does not perform the bandwidth reservation processing and broadcasts a report message 502 indicating session information about session channel and bandwidth. The message 502 has message type 201 set to "report", channel number 202 set to C1, destination address 203 set to A1, protocol type 204 set to "UDP", destination port number 205 set to P1, bandwidth 206 set to a total of bandwidths which have been reserved by the node 101 (at this time, a broader one of B1 and B2), and reserved bandwidth status 207 set to "shared".

When receiving the report message 502, the node 103 starts receiving (listening) data using the channel #C1.

Withdrawal from session (1)

Figure 6:
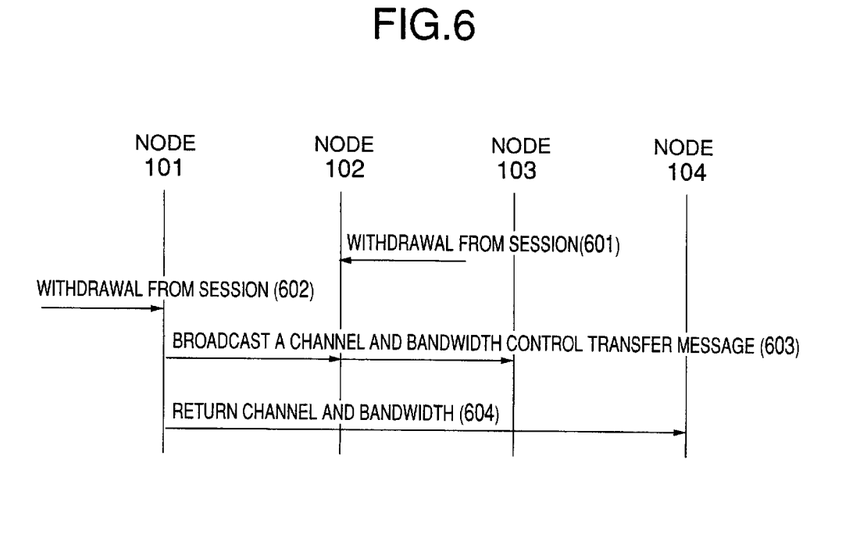
FIG. 6 is a sequence diagram showing a channel deallocating procedure performed by an administration node which remains last according to the first embodiment.

Referring to FIG. 6, it is assumed that the node 102 receives session termination instruction before the node 101. When receiving the session termination instruction 601, the node 102 stops sending and receiving on the channel #C1 because the node 102 does not manage the session.

When receiving session termination instruction 602, the node 101 broadcasts a channel and bandwidth control transfer message 603 which has message type 201 set to "control transfer", channel number 202 set to C1, destination address 203 set to A1, protocol type 204 set to "UDP", destination port number 205 set to P1, bandwidth 206 set to a total of bandwidths which have been reserved by the node 101 (at this time, a broader one of B1 and B2), and reserved bandwidth status 207 set to "shared".

Although the node 102 receives the channel and bandwidth control transfer message 603 from the node 101, the node 102 performs nothing because the node 102 does not participate in this session. Similarly, the node 103 receives the channel and bandwidth control transfer message 603 from the node 101, but the node 103 also performs nothing because the node 103 performs only data reception.

When receiving no reply to the channel control transfer message 603, the node 101 determines that there is no node that can inherit the channel and bandwidth control from the node 101. Then, the node 101 performs deallocation processing 604 to return the reserved channel and bandwidth for the session to the node 104 which is the IRM. Thereafter, each node stops sending and receiving through the channel.

Withdrawal from session (2)

Figure 7:
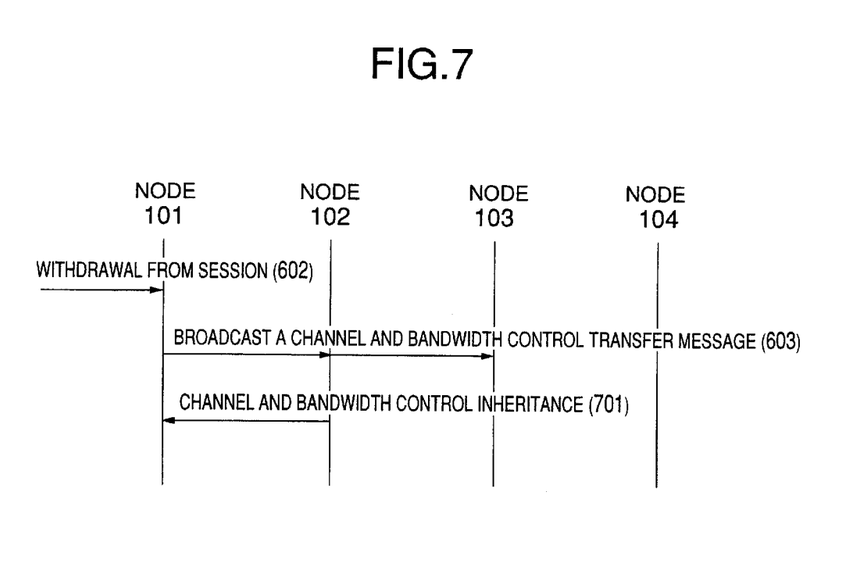
FIG. 7 is a sequence diagram showing a channel and bandwidth control transfer procedure by an administration node according to the first embodiment.

Referring to FIG. 7, it is assumed that the node 101 receives session termination instruction. When receiving the session termination instruction 602, the node 101 broadcasts the channel and bandwidth control transfer message 603 which has message type 201 set to "control transfer", channel number 202 set to C1, destination address 203 set to A1, protocol type 204 set to "UDP", destination port number 205 set to P1, bandwidth 206 set to a total of bandwidths which have been reserved by the node 101 (at this time, a greater one of B1 and B2), and reserved bandwidth status 207 set to "shared".

When receiving the channel and bandwidth control transfer message 603 from the node 101, the node 102 reads the session information included in the channel and bandwidth control transfer message 603, that is, the destination address 203, the protocol type 204, and the destination port number 205. The node 10 determines from the received session information whether the channel and bandwidth control transfer message 603 is directed to the session in which the node 102 itself participates. Since the destination address 203 is A1, the protocol type 204 is UDP, and the destination port number 205 is P1, the node 102 determines that the channel and bandwidth control transfer message 603 is directed to the session in which the node 102 itself participates.

When it is determined that the channel and bandwidth control transfer message 603 is directed to the session in which the node 102 itself participates, the node 102 broadcasts a control inheritance message 701 which indicates that the node 102 inherits the channel and bandwidth control for this session. The control inheritance message 701 has message type 201 set to "report", channel number 202 set to C1, destination address 203 set to A1, protocol type 204 set to "UDP", destination port number 205 set to P1, bandwidth 206 set to a total of bandwidths which have been reserved by the node 101 (have, a broader one of B1 and B2), and reserved bandwidth status 207 set to "shared". Similarly, the node 103 receives the control inheritance message 701 from the node 101, but the node 103 performs nothing because the node 103 performs only data reception.

When receiving the control inheritance message 701 from the node 102, the node 101 determines that the node 102 inherits the channel and bandwidth control from the node 101 and thereafter the node 101 stops sending and receiving through this channel.

The node 102 determines whether a control inheritance message is received from another node. When receiving the control inheritance message from another node, the node 102 further determines whether the node ID of the other node broadcasting the control inheritance message is greater than that of the node 102 itself. If the node ID of the other node is greater than the node ID of its own, then the node 102 withdraws the inheritance of the channel and bandwidth control. If the node ID of the other node is smaller than the node ID of its own, the node 102 inherits the channel and bandwidth control from the node 101 and becomes a new session management node. When receiving no control inheritance message, the node 102 also inherits the channel and bandwidth control from the node 101 and becomes a new session management node.

When terminating the session, the node 102 performs the channel and bandwidth control transfer processing and the deallocation processing as in the case of the node 101 described before.

Deallocation of extra bandwidth

Figure 8:
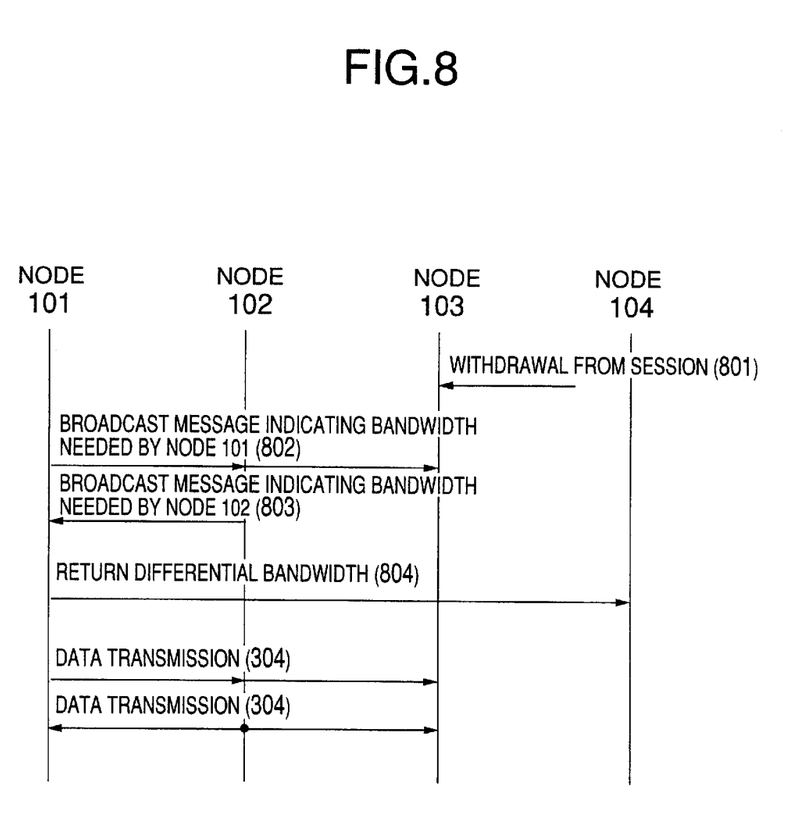
FIG. 8 is a sequence diagram showing an extra-bandwidth return procedure according to the first embodiment.

It is assumed that the node 103 also sends data requiring a bandwidth of B3 in the session, where B3>B1 and B3>B2. Therefore, as described before, the node 101 has already reserved a differential bandwidth—B3—(a broader one of B1 and B2), resulting in a total of reserved bandwidths equal to the bandwidth B3. In this session, it is assumed that the node 103 withdraws from the session.

Referring to FIG. 8, when the node 103 receives a session termination instruction 801 and withdraws from the session, the node 101 which manages the session periodically broadcasts a report message 802 indicating the bandwidth needed by the node 101 itself. The report message 802 has message type 201 set to "report", channel number 202 set to C1, destination address 203 set to A1, protocol type 204 set to "UDP", destination port number 205 set to P1, bandwidth 206 set to B1, and reserved bandwidth status 207 set to "shared".

Each node, when receiving the report message 802, determines whether the bandwidth of B1 included in the report message 802 is smaller than the bandwidth needed by the node itself. In this example, only the node 102 receives the report message 802 because the node 103 has withdrawn from the session. If the bandwidth of B1 included in the report message 802 is smaller than the bandwidth needed by the node itself (here, B1<B2), then the node 102 broadcasts a query message 803 indicating the bandwidth needed thereby. The query message 803 has message type 201 set to "query", channel number 202 set to C1, destination address 203 set to A1, protocol type 204 set to "UDP", destination port number 205 set to P1, bandwidth 206 set to D2, and reserved bandwidth status 207 set to "shared". On the other hand, if B1>B2, then the node 102 sends nothing.

When receiving the query message 803, the node 101 determines whether B1<B2. If B1<B2, then the node 101 performs deallocation processing 804 to return the extra bandwidth (B3−B2) to the node 104 which is the IRM. If B1>B2, then the node 101 receives nothing from the node 102. Therefore, the node 101 performs deallocation processing 804 to return the extra bandwidth (B3−B2) to the node 104 which is the IRM.

In this manner, when a node using a bandwidth broader than the bandwidth of a management node withdraws from the session, the extra bandwidth is deallocated, resulting in efficient use of IEEE bus.

SECOND EMBODIMENT

Hereafter, it is assumed that the node 101 uses a bandwidth of B1 to send data in the session, the node 102 uses a bandwidth of B2 to send data in the session, and the nodes 101 and 102 may send data concurrently.

Initial channel and bandwidth reservation

Figure 9:
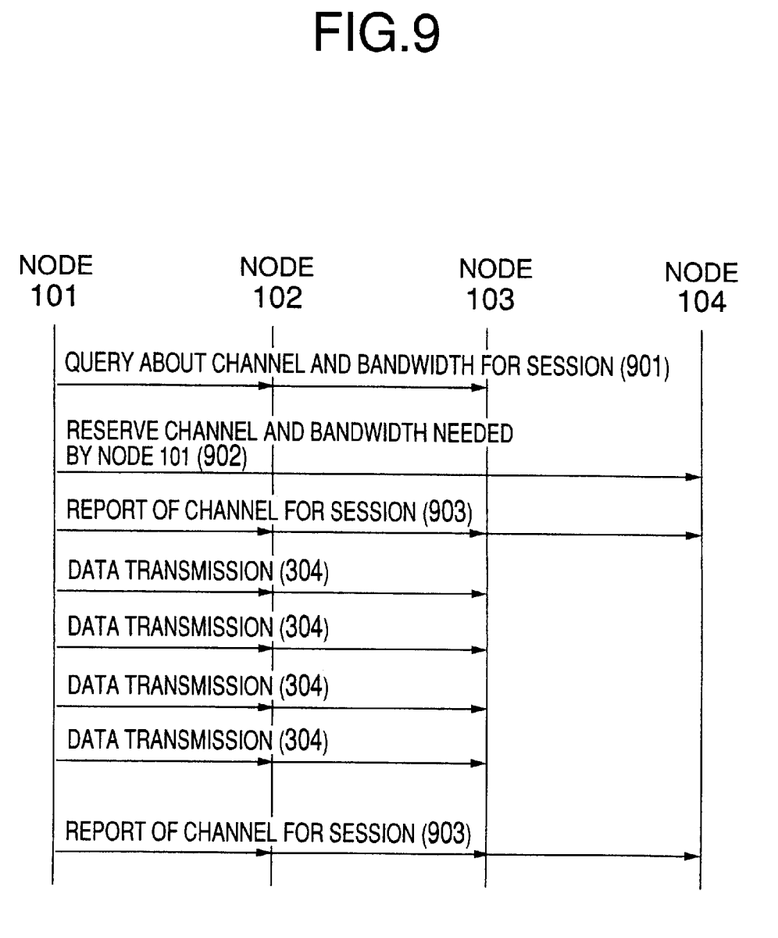
FIG. 9 a sequence diagram showing a channel and bandwidth reserving procedure performed by a node which initially starts sending data according to a second embodiment of the present invention, wherein the reserved bandwidth is necessary for the node itself.

Referring to FIG. 9, the node 101 which intends sending data initially broadcasts a query message 901 for querying whether a channel for this session have been reserved, the query message 901 including message type 201="query", destination address 203=A1, protocol type 204=UDP, destination port number 205=P1, and reserved bandwidth status 207="occupied".

When the node 101 receives no reply to the query message 901, the node 101 performs processing 902 to reserve the channel=C1 and the bandwidth=B1 which is used by the node 101 by accessing the node 104 which is the IRM. Thereafter, the node 101 periodically broadcasts a report message 903 indicating session information about the channel. The message 903 has message type 201 set to "report", channel number 202 set to C1, destination address 203 set to A1, protocol type 204 set to "UDP", destination port number 205 set to P1, and reserved bandwidth status 207 set to "occupied".

Then, the node 101 starts sending data 304 (talking) using Isochronous Stream through the reserved channel #C1 and at the same time starting receiving (listening) data using the same channel #C1. In this manner, the node 101 is allowed to send data using the channel #C1 and the necessary bandwidth of B1.

Second or later bandwidth reservation

Figure 10:
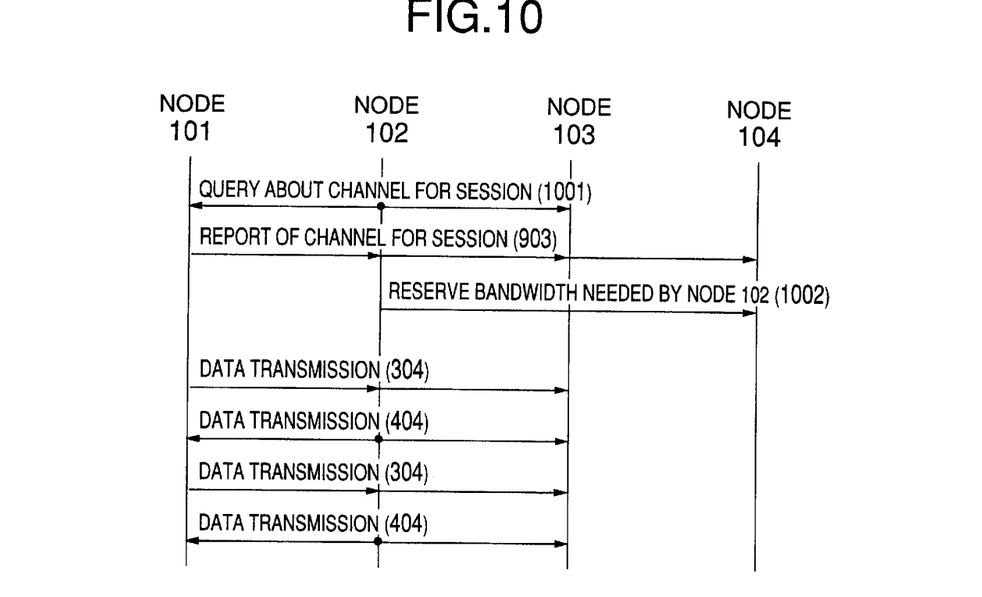
FIG. 10 is a sequence diagram showing a bandwidth reserving procedure performed by a node which starts sending data second or thereafter according to the second embodiment, wherein the reserved bandwidth is necessary for the node itself.

Referring to FIG. 10, it is assumed that the node 102 intends sending data. First, the node 102 broadcasts a query message 1001 for querying whether a channel for this session have been reserved, the query message 1001 including: message type 201="query", destination address 203=A1, protocol type 204=UDP, destination port number 205=P1, and reserved bandwidth status 207="occupied".

When the node 101 receives the query message 1001 from the node 102, the node 101 reads the session information included in the query message 1001, that is, the destination address 203, the protocol type 204, and the destination port number 205. The node 101 determines from the received session information whether the query message 1001 is directed to the session managed by the node 101 itself. Since the destination address 203 is A1, the protocol type 204 is UDP, and the destination port number 205 is P1, the node 101 determines that the query message 1001 is directed to the session managed by the node 101.

Thereafter, the node 101 broadcasts a report message 903 indicating information about session channel. The message 903 has message type 201 set to "report", channel number 202 set to C1, destination address 203 set to A1, protocol type 204 set to "UDP", destination port number 205 set to P1, and reserved bandwidth status 207 set to "occupied".

When receiving the report message 903, the node 102 determines whether the reserved bandwidth status 207 is set to "occupied". If the reserved bandwidth status 207 is set to "occupied", then the node 102 performs bandwidth reservation processing 1002 to reserve the necessary bandwidth of D2 by accessing the node 104 which is the IRM. Thereafter, the node 102 starts sending data 404 (talking) using Isochronous Stream through the channel #C1 and at the same time starting receiving (listening) data using the same channel #C1. In this manner, the mode 102 is allowed to send data of the necessary bandwidth B2.

As described before, there are cases where the nodes 101 and 102 concurrently send data. However, the respective nodes 101 and 102 have reserved necessary bandwidths B1 and B2. Therefore, none of the nodes 101 and 102 sends data greater than the bandwidth assigned to the channel #C1.

The receiving procedure of the node 103 is the same as described in the first embodiment. Therefore, the details are omitted.

Withdrawal from session (1)

Figure 11:
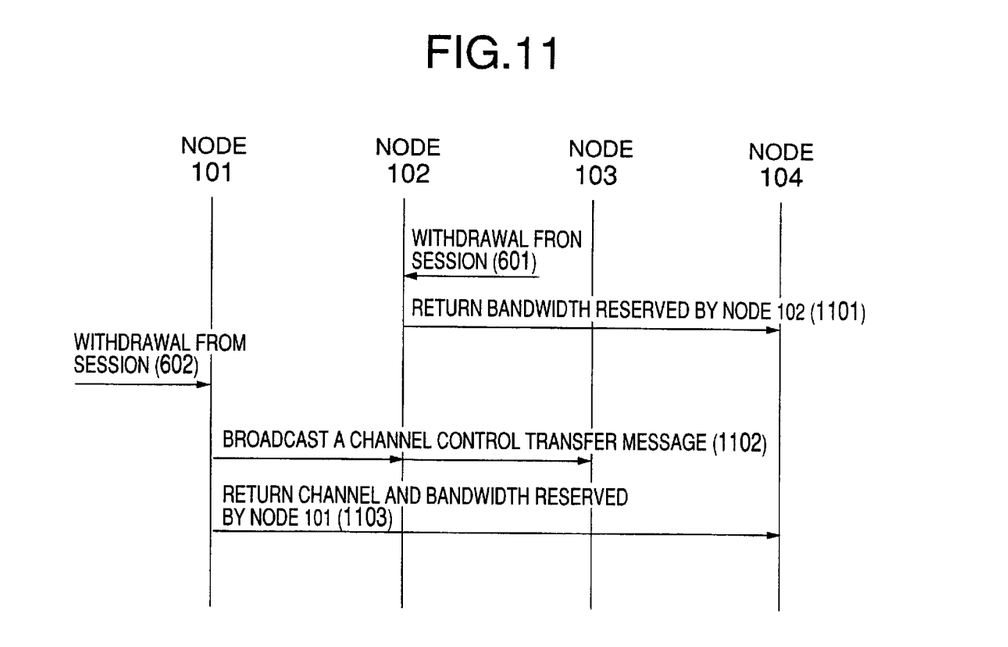
FIG. 11 is a sequence diagram showing a channel and bandwidth deallocating procedure performed by an administration node which remains last according to the first embodiment, wherein the deallocated bandwidth was allocated to the administration node itself.

Referring to FIG. 11, it is assumed that the node 102 receives session termination instruction before the node 101. When receiving the session termination instruction 601, the node 102 performs the bandwidth return processing 1101 to return the acquired bandwidth B2 to the node 104 which is the IRM before stopping sending and receiving through the channel.

When receiving session termination instruction 602, the node 101 broadcasts a channel control transfer message 1102 which has message type 201 set to "control transfer", channel number 202 set to C1, destination address 203 set to A1, protocol type 204 set to "UDP", destination port number 205 set to P1, and reserved bandwidth status 207 set to "occupied".

Although the node 102 receives the channel control transfer message 1102 from the node 101, the node 102 performs nothing because the node 102 does not participate in this session. Similarly, the node 103 receives the channel and bandwidth control transfer message 603 from the node 101, but the node 103 also performs nothing because the node 103 performs only data reception.

When receiving no reply to the channel control transfer message 1102, the node 101 determines that there is no node that can inherit the channel control from the node 101. Then, the node 101 performs deallocation processing 1103 to return the reserved channel and acquired bandwidth for the session to the node 104 which is the IRM. Thereafter, the node 101 stops sending and receiving through the channel.

Withdrawal from session (2)

Figure 12:
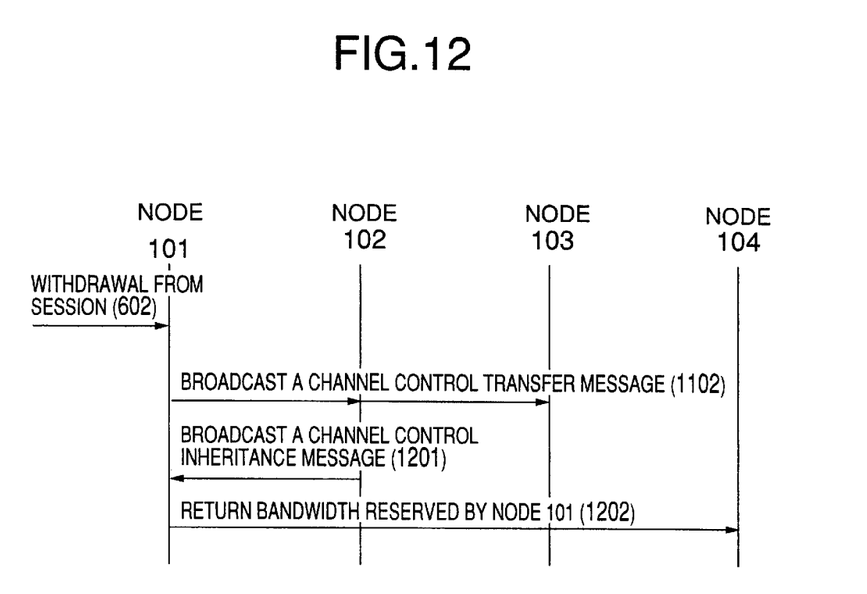
FIG. 12 is a sequence diagram showing a channel control transfer procedure performed by an administration node according to the first embodiment, wherein the bandwidth allocated to the administration node itself is deallocated.

Referring to FIG. 12, it is assumed that the node 101 receives session termination instruction. When receiving the session termination instruction 602, the node 101 broadcasts the channel control transfer message 1102 which has message type 201 set to "control transfer", channel number 202 set to C1, destination address 203 set to A1, protocol type 204 set to "UDP", destination port number 205 set to P1, and reserved bandwidth status 207 set to "occupied".

When receiving the channel control transfer message 1102 from the node 101, the node 102 reads the session information included in the channel control transfer message 1102, that is, the destination address 203, the protocol type 204, and the destination port number 205. The node 102 determines from the received session information whether the channel control transfer message 1102 is directed to the session in which the node 102 itself participates. Since the destination address 203 is A1, the protocol type 204 is UDP, and the destination port number 205 is P1, the node 102 determines that the channel control transfer message 1102 is directed to the session in which the node 102 itself participates.

When it is determined that the channel control transfer message 1102 is directed to the session in which the node 102 itself participates, the node 102 sends a control inheritance message 1201 which indicates that the node 102 inherits the channel control for this session. The control inheritance message 1201 has message type 201 set to "report", channel number 202 set to C1, destination address 203 set to A1, protocol type 204 set to "UDP", destination port number 205 set to P1, and reserved bandwidth status 207 set to "occupied". Similarly, the node 103 receives the control inheritance message 1102 from the node 101, but the node 103 performs nothing because the node 103 performs only data reception.

When receiving the control inheritance message 1201 from the node 102, the node 101 determines that the node 102 inherits the channel control from the node 101 and thereafter the node 101 performs bandwidth return processing 1202 to return the acquired bandwidth B1 to the node 104 which is the IRM before stopping sending and receiving through this channel.

The node 102 determines whether a control inheritance message is received from another node. When receiving the control inheritance message from another node, the node 102 further determines whether the node ID of the other node broadcasting the control inheritance message is greater than that of the node 102 itself. If the node ID of the other node is greater than the node ID of its own, then the node 102 withdraws the inheritance of the channel control. If the node ID of the other node is smaller than the node ID of its own, the node 102 inherits the channel control from the node 101 and becomes a new session management node. When receiving no control inheritance message, the node 102 also inherits the channel control from the node 101 and becomes a new session management node.

When terminating the session, the node 102 performs the channel control transfer processing and the deallocation processing as in the case of the node 101 described before.

What is claimed is:

1. A data communication method in a network comprised of a plurality of nodes having functions conforming to IEEE 1394 1995 Serial Bus Standard (hereafter, referred to as IEEE 1394), wherein at least one node has a function of an Isochronous Resource Manager (IRM) defined in IEEE 1394 and the nodes participate in a session such that two or more nodes do not concurrently send data, the method comprising the steps of:

determining a session management node which manages a channel and a bandwidth thereof for the session;
at the session management node,
monitoring a bandwidth requested by each of the nodes participating in the session; and
reserving a maximum bandwidth among the bandwidths requested by the nodes participating in the session by accessing the Isochronous Resource Manager, to allow communication by sharing the maximum bandwidth among nodes which participate in the session, further comprising the steps of:
at a first node other than the session management node,
terminating communication when the first node withdraws from the session;
at the session management node,
broadcasting a control transfer message for transferring control of the channel and the bandwidth for the session when the session management node withdraws from the session, the control transfer message including information of the channel and the maximum bandwidth;
when no response is received to the control transfer message at the session management node, returning the maximum bandwidth which has been reserved to the Isochronous Resource Manager to terminate communication; and
when a response to the control transfer message is received from a second node continuing to send data in the session, terminating the communication at the session management node.

2. The method according to claim 1, further comprising the steps of:
at a node which intends to send data in the session,
broadcasting a first query messages for querying whether a channel and a bandwidth for the session have been reserved;
when the channel and the bandwidth for the session have not been reserved in the network, reserving a channel and a first bandwidth needed by the node for the session;
assigning the node as the session management node.

3. The method according to claim 2, further comprising the step of:
at the node sending data using an isochronous stream in the channel.

4. The method according to claim 1, further comprising the steps of:
receiving a first query message for querying whether a channel and a bandwidth for the session have been reserved from the first node other than the session management node, wherein the first query message includes a first bandwidth needed by the first node; and
comparing the first bandwidth requested by the first node with the maximum bandwidth.

5. The method according to claim 4, wherein:
when the first bandwidth is broader than the maximum bandwidth, reserving a differential bandwidth between the first bandwidth and the maximum bandwidth by accessing the Isochronous Resource Manager; and
broadcasting a report message including session identifying information and the bandwidth which has been reserved.

6. The method according to claim 5, further comprising the step of:
at a second node which has received the report message from the session management node,
sending data using an isochronous stream in the channel.

7. The method according to claim 1, further comprising the steps of:
at a first node participating in the session only to receive data, broadcasting a query message for querying whether a channel and a bandwidth for the session have been reserved;

at the session management node, broadcasting a report message indicating the channel and the maximum bandwidth for the session in response to the query message; and at the first node, receiving data through the channel designated by the report message received from the session management node.

8. The method according to claim 1, further comprising the steps of:

at the second node continuing to send data in the session, broadcasting a control inheritance message for inheriting the control of the channel and the bandwidth for the session in response to the control transfer message received from the session management node;

designating the second node as the session management node; and at the session management node, terminating the communication when the control inheritance message is received.

9. The method according to claim 8, further comprising the step of:

at the second node continuing to send data in the session, when the control inheritance message is received from a third node, determining whether the second node inherits the control of the channel and the bandwidth for the session based on a comparison between node identification numbers of the second node and the third node.

10. The method according to claim 9, wherein only one node having a maximum node identification number among nodes broadcasting the control inheritance message inherits the control of the channel and the bandwidth for the session.

11. A data communication method in a network comprised of a plurality of nodes having functions conforming to IEEE 1394 1995 Serial Bus Standard (hereafter, referred to as IEEE 1394), wherein at least one node has a function of an Isochronous Resource Manager (IRM) defined in IEEE 1394 and the nodes participate in a session such that two or more nodes do not concurrently send data, the method comprising the steps of:

determining a session management node which manages a channel and a bandwidth thereof for the session;

at the session management node, monitoring a bandwidth requested by each of the nodes participating in the session; and reserving a maximum bandwidth among the bandwidths requested by the nodes participating in the session by accessing the Isochronous Resource Manager, to allow communication by sharing the maximum bandwidth among nodes which participate in the session, further comprising the steps of:

at the session management node, periodically broadcasting a report message indicating the channel and a first bandwidth needed by the session management node;

at a first node which receives the report message, comparing a second bandwidth for the session needed by the second node with the first bandwidth needed by the session management node; and when the second bandwidth is broader than the first bandwidth, broadcasting a query message including information of the second bandwidth;

at a session management node, when the query message is received, comparing the reserved bandwidth with maximum receive bandwidth selected from at least one query message received; and when the maximum received bandwidth is narrower than the reserved bandwidth, returning a differential bandwidth between the maximum received bandwidth and the reserved bandwidth to the Isochronous Resource Manager.

12. The method according to claim 11, further comprising the step of:

at the session management node, when a node needing the maximum received bandwidth withdraws from the session, deallocating the differential bandwidth by accessing the Isochronous Resource Manager.

13. A data communication method in a network comprised of a plurality of nodes having functions conforming to IEEE 1394 1995 Serial Bus Standard (hereafter, referred to as IEEE 1394), wherein at least one node has a function of an Isochronous Resource Manager (IRM) defined in IEEE 1394 and the nodes participate in a session such that two or more nodes do not concurrently send data, the method comprising the steps of:

determining a session management node which manages a channel and a bandwidth thereof for the session;

at the session management node, monitoring a bandwidth requested by each of the nodes participating in the session; and reserving a maximum bandwidth among the bandwidths requested by the nodes participating in the session by accessing the Isochronous Resource Manager, to allow communication by sharing the maximum bandwidth among nodes which participate in the session, wherein, assuming that a size of Subaction Cap defined in IEEE 1394 is SG, a size of Arbitration Reset Gap defined in IEEE 1394 is ARG, a maximum size of a frame allowed to be sent in Asynchronous Stream defined in IEEE 1394 is M, and a number of nodes connected to the network is N, a remaining amount of bandwidth in the Isochronous Resource Manager is B, when the remaining bandwidth B is equal to or smaller than $(SG-M) \times N + ARG$, each node performs data transmission using an asynchronous stream instead of an isochronous stream, allowing data to be sent a plurality of times in one cycle time defined in IEEE 1394.

14. A data communication method in a network comprised of a plurality of nodes having functions conforming to IEEE 1394 1995 Serial Bus Standard (hereafter, referred to as IEEE 1394), wherein at least one node has a function of an Isochronous Resource Manager (IRM) defined in IEEE 1394 and the nodes participate in a session such that two or more nodes can send data concurrently, the method comprising the steps of:

determining a session management node which manages a channel and a bandwidth thereof for the session;

at the session management node, reserving a first bandwidth needed by the session management node by accessing the Isochronous Resource Manager; and for each node other than the session management node, participating in the session, reserving a bandwidth needed by each node by accessing the Isochronous Resource Manager, to allow communications such that a dedicated bandwidth is allocated for each node, at a second node participating in the session only to receive data, terminating communication when the second node withdraws from the session;

at a third node participating in the session to send data, when the third node withdraws from the session, returning bandwidth reserved for the third node to the Isochronous Resource Manager to terminate communication;

at the session management node, broadcasting a control transfer message for transferring control of the channel for the session when the session management node withdraws from the session;

when no response is received to the control transfer message at the session management node returning the channel and the bandwidth which has been reserved to the Isochronous Resource Manager to terminate communication; and when a response is received to the control transfer message from a fourth node continuing to send data in the session, returning the bandwidth which has been reserved to the Isochronous Resource Manager to terminate communication.

15. The method according to claim 14, wherein at the fourth node continuing to send data in the session, broadcasting a control inheritance message for inheriting the control of the channel for the session in response to the control transfer message received from the session management node.

16. The method according to claim 15, further comprising the step of:

at the fourth node continuing to send data in the session, when the control inheritance message is received from a fifth node, determining whether the fourth node inherits the control of the channel for the session depending on a comparison between node identification numbers of the fourth node and the fifth node.

17. The method according to claim 16, wherein only one node having a maximum node identification number among nodes broadcasting the control inheritance message inherits the control of the channel for the session.

* * * * *